D. J. MARTIN.
ANTISKID DEVICE.
APPLICATION FILED JAN. 20, 1911.

1,023,580.

Patented Apr. 16, 1912.

WITNESSES

INVENTOR
Douglas J. Martin
BY
ATTORNEYS

UNITED STATES PATENT OFFICE.

DOUGLAS J. MARTIN, OF NEW YORK, N. Y.

ANTISKID DEVICE.

1,023,580.  Specification of Letters Patent.  Patented Apr. 16, 1912.

Application filed January 20, 1911. Serial No. 603,634.

*To all whom it may concern:*

Be it known that I, DOUGLAS J. MARTIN, a citizen of the United States, and a resident of the city of New York, borough of Manhattan, in the county and State of New York, have invented a new and Improved Antiskid Device, of which the following is a full, clear, and exact description.

My invention relates to an anti-skid chain adapted to be placed upon vehicle tires, and especially adapted for use in connection with pneumatic tires on automobiles and similar vehicles.

It has been found in the use of the form of skid chains now on the market, that two or three links on the working tread of the tire wear down very rapidly, while the chains on the side or offset from the working tread remain in as good a condition as when first applied. In order to repair the chain, it is customary either to take out the few worn links or else to reinsert an entirely new chain or a new section of chain, necessitating great expense and inconvenience, so that it will be seen that it is not possible to use the entire chain in order to get the full working value of its construction.

An object of my invention is to overcome this difficulty by constructing a chain which as soon as it is somewhat worn on the tread, may be fed to one side, thereby presenting a new unworn portion of the chain to the wearing action between the tire and road surface.

Another object of my invention is to provide a chain so constructed and adapted as to be readily placed upon the tire of a wheel.

A further object of my invention is to provide a chain so constructed and arranged that different parts of the chain may be progressively fed across the wearing surface.

With the above and other objects in view, as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming a part of this specification, in which similar characters of reference indicate corresponding parts in all the figures, and in which—

Figure 1:
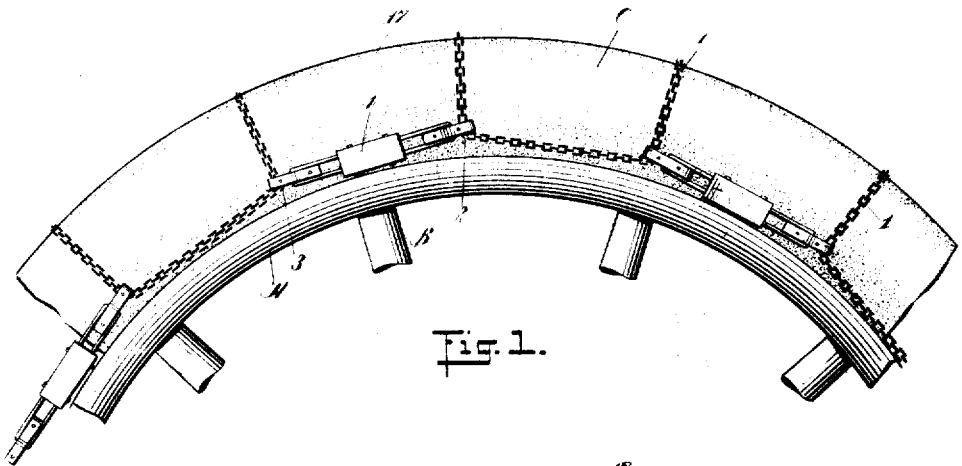
Figure 2:
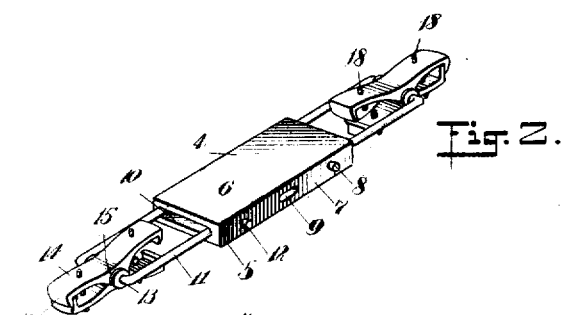
Figure 3:
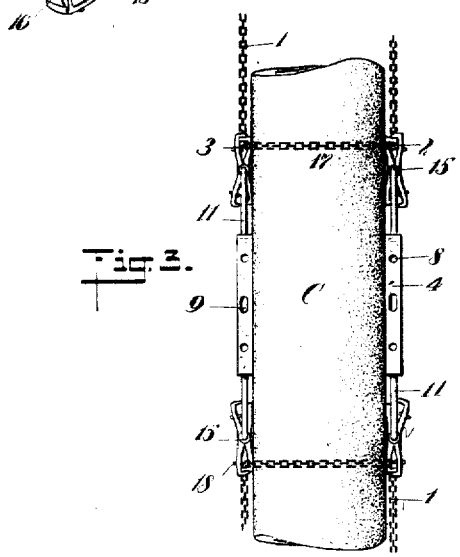

Figure 1 is a side elevation of part of a wheel construction, showing a preferred embodiment of my invention applied thereto; Fig. 2 is a perspective view of the fastening clamp; and Fig. 3 is a plan view looking down upon a section of the wheel shown in Fig. 1.

In the several figures, I have shown a common form of wheel having a rim A, spokes B and a tire C. My anti-skid device is placed about this tire C, and comprises a series of endless chains 1, preferably made up of flat links, or of links of a half-turned variety. These chains are laid on the tire, and are preferably rectangular in plan but conform to the configuration of the tire. The chains are spaced apart a predetermined distance, and the adjacent corners 2 and 3 of successive chains are fastened together on the side by means of a clamp 4. Instead of laying the chain flat as shown, the chain may be turned on itself about ninety degrees, to form alined eyes in adjacent links, through which alined eyes may be passed teeth 16, hereinafter described, so as to make a right-angle pull between the chains extending in a direction across and along the tire. The clamp 4 may be of any preferred construction, but in this disclosure I have shown a hollow rectangular casing 5, having opposite relatively broad flat faces 6, adapted to lie flat against the side of the tire C, and having on the opposite edges 7, alined apertures 8, adjacent each end. Further, there is centrally disposed in each of the opposite edges, a slot 9.

Adapted to be inserted in the opposite open ends 10 of the casing, is a substantially U-shaped spring member 11, the legs of which are outturned to form lugs 12 adapted to fit in each pair of the alined apertures 8, or in the slot 9 when it is desired to draw the chains closer together. The crotch 13 of the spring member 11 affords a bearing for the two-part spring jaw centrally pivoted upon this bearing. This crotch or bearing 13 is offset a sufficient distance from the edge of the casing 6, in order to allow the jaws to be rotated about their fulcrum point 15. The jaws 14 comprise two pivoted parts, each part being formed of a plate with the part in advance of the fulcrum point at a large acute angle to the part in rear of the fulcrum point, and hinged together, thereby forming an opposed double jaw device. The ends of each of these points are bent inward to form the teeth 16. It will be seen by this arrangement, that while the teeth 16 on one side of the fulcrum point are in contact, the teeth on the other side of the point are open; that is, while the jaws on one side are in engagement with the chain, the jaws of the opposite set are open. Pins 18 may be passed through the jaws 14 to further take up slack in the chain.

The chain may be assembled on the tire, as shown in Fig. 1 and used in this position until the few links at the apex 17 of the bearing surface of the tire begin to show wear; then, as the chain does not fit absolutely tight about the tire but admits of some play, the jaw 14 may be rotated about the fulcrum point 13, thereby drawing the chain a slight distance across the tire. By this movement, the opposite open jaw will be brought up into engagement with the chain a distance beyond the gripping portion, dependent upon the distance between the opposed jaws, and the chain will be gripped in a new position, and, at the same time, will be released from its old position. Then by going entirely around the periphery of the wheel, each jaw may be rotated and the worn links in each chain drawn to the side of the tire out of the line of the wearing portion of the wheel, and a new unworn portion of the chain fed on to this position. It will be seen by this construction and arrangement, that the entire chain may be worn uniformly, thereby prolonging the life of the chain.

Many changes could be made in the above construction and many apparently widely different embodiments of this invention could be made without departing from the scope thereof. It is intended that all matters contained herein, in the above description, or shown in the accompanying drawings, shall be interpreted as illustrative and not in a limiting sense. It is also to be understood that the language used in the following claims is merely intended to cover all the generic and specific features of the invention herein described and all statements of the scope of the invention, which as a matter of language, might be said to fall therebetween, and that materials, sizes and relativities of parts are non-essential, except as called for in the claims.

Having thus described my invention, I claim as new and desire to secure by Letters Patent:

1. In an anti-skid device, a series of endless chains adapted to be spaced apart about a tire, clamps connecting adjacent chains at the side of said tire, to keep the chains in open position, each clamp having a pair of clips pivoted to the opposite ends thereof, each clip having double jaws and teeth projecting inwardly from opposite jaws, the teeth of one jaw engaging the adjacent chain, said clips pivoted to the clamps whereby the jaws may be rotated to carry the attached chain to a new position, so that it may be grasped in the new position by the opposite jaw of the clip.

2. In an anti-skid device, a series of endless chains rectangular in plan, spaced apart on a tire and conforming to the configuration of the top and side of the same, a clamp fastening together adjacent corners of successive chains, said clamp comprising a rectangular casing having flat faces adapted to lie flat against the side of the tire and having alined apertures adjacent each end. U-shaped spring members engaging in said apertures, and a two-part spring jaw pivoted on the crotch of each member, one of said jaw portions engaging the adjacent chain.

3. In an anti-skid device, a series of endless chains adapted to be spaced about a tire, clamps between adjacent chains at the sides of the tire to keep the chains in open position, a clip on each end of the clamps, each clip having double spring jaws on each end of the same, and teeth projecting inwardly from the opposite jaws, the teeth of one jaw engaging the chains, so that the clip may be rotated to carry each chain to a new position in order that it may be grasped in a new position by the teeth of the other jaw.

4. An anti-skid device, comprising a series of endless chains spaced apart and forming gripping tread members adapted to be disposed across the tread portion of the tire, clamps positioned between adjacent members, each of said clamps having a double jaw clip pivoted at its center to opposite ends of the clamps, one jaw of each clip engaging the adjacent tread member, whereby the rotation of said clip will feed portions of said tread members across the wearing portions of the tire.

In testimony whereof I have signed my name to this specification in the presence of two subscribing witnesses.

DOUGLAS J. MARTIN.

Witnesses:
W. S. ORTON,
PHILIP D. ROLLHAUS.